United States Patent
Edmonds et al.

(10) Patent No.: US 10,824,332 B2
(45) Date of Patent: Nov. 3, 2020

(54) CONTROLLING TOUCHSCREEN INPUTS TO A DEVICE

(71) Applicant: International Business Machines Corporation, Armonk, NY (US)

(72) Inventors: Paul M. R. Edmonds, Southampton (GB); Joe Pavitt, Chandler's Ford (GB); James E. Ravenscroft, Chandler's Ford (GB); James Sutton, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 15/251,593

(22) Filed: Aug. 30, 2016

(65) Prior Publication Data
US 2018/0059920 A1    Mar. 1, 2018

(51) Int. Cl.
*G06F 3/048* (2013.01)
*G06F 3/0488* (2013.01)

(52) U.S. Cl.
CPC ............................... *G06F 3/04886* (2013.01)

(58) Field of Classification Search
CPC .................................................. G06F 3/04886
See application file for complete search history.

(56) References Cited

U.S. PATENT DOCUMENTS

| | | | | |
|---|---|---|---|---|
| 7,380,218 B2* | 5/2008 | Rundell | ................... | G06F 9/451 715/808 |
| 7,847,789 B2 | 12/2010 | Kolmykov-Zotov et al. | | |
| 9,244,545 B2 | 1/2016 | Hinckley et al. | | |
| 2006/0085581 A1* | 4/2006 | Martin | .................... | G06F 9/542 710/260 |
| 2012/0158629 A1* | 6/2012 | Hinckley | ................ | G06F 3/038 706/15 |
| 2013/0178195 A1* | 7/2013 | Luna | ..................... | H04W 24/04 455/414.1 |
| 2014/0085201 A1* | 3/2014 | Carmel-Veilleux | ......................... | G06F 1/1694 345/158 |
| 2014/0304649 A1* | 10/2014 | Phegade | ............... | G06F 21/629 715/809 |
| 2018/0189069 A1* | 7/2018 | Huang | ................ | G06F 3/04817 |

OTHER PUBLICATIONS

No Touch: Prevent Accidental Touches While Watching Movies or Reading [Android] Author: A. Rehman, Date: Jan. 6, 2012, Retrieved from: URL:http://www.addictivetips.com/mobile/no-touch-prevent-accidental-touches-while-watching-movies-android/, 4 pages.

* cited by examiner

*Primary Examiner* — Anil N Kumar
(74) *Attorney, Agent, or Firm* — Schmeisser, Olson & Watts, LLP; Mark Vallone (57) ABSTRACT

A method, a computer program product, and a device that includes one or more processors, a touchscreen, and an operating system. A first dialogue interface is displayed on the touchscreen for receiving user commands by a user touching the dialogue interface. Received user commands are ignored for a defined first period of time in response to the operating system causing a generation of a second dialogue interface on the touchscreen, wherein the defined first period of time is a function of a user interaction with the touch screen by the user.

14 Claims, 5 Drawing Sheets

CONTROLLING TOUCHSCREEN INPUTS TO A DEVICE

TECHNICAL FIELD

The present invention pertains to controlling a device via controlling touchscreen inputs to the device by a user.

BACKGROUND

Many electronic devices currently include touchscreens that allow a user of the electronic device to provide user inputs to the electronic device. Such electronic devices include but are not limited to mobile phones, tablet computers, laptop computers, personal computers with a touchscreen display, navigation devices, smart wearable devices such as smart watches, etcetera.

Many users benefit from the use of touchscreens by being able to enter user inputs through the touchscreen in quick succession, for example when entering keystrokes into a dialogue interface such as an on-screen keyboard. Such high rate of user input provision is not without problems.

For example, a common annoyance to users of such electronic devices is that during the input of such user inputs through a dialogue interface displayed on the touchscreen, the operating system of the electronic device may launch a further dialogue interface superimposed over the dialogue interface into which the user is inserting user inputs. Such a further dialogue interface for example may be caused by a background process of the electronic device requiring user inputs.

A user rapidly providing inputs may fail to notice the launch of the further dialogue interface, such that the user inputs provided by the user and intended for the dialogue interface may instead be provided to the further dialogue interface, which is not only annoying because these user inputs are provided in vain, but may further be annoying because the further dialogue interface may respond to the provided user inputs despite these inputs not being intended for the further dialogue interface which may trigger the electronic device to enter an undesired mode of operation, or may cause the electronic device to install, launch or terminate an application or operation contrary to the intention of the user.

SUMMARY

The present invention provides a method, and an associated computer program product and a device that includes one or more processors, a touchscreen, and an operating system. The one or more processors display a first dialogue interface on the touchscreen for receiving user commands by a user touching the dialogue interface. The one or more processors ignore received user commands for a defined first period of time in response to the operating system causing a generation of a second dialogue interface on the touchscreen, wherein the defined first period of time is a function of a user interaction with the touch screen by the user.

BRIEF DESCRIPTION OF THE DRAWINGS

Embodiments of the present invention will now be described, by way of example only, with reference to the following drawings.

DETAILED DESCRIPTION

It should be understood that the Figures are merely schematic and are not drawn to scale. It should also be understood that the same reference numerals are used throughout the Figures to indicate the same or similar parts.

Embodiments of the present invention are concerned with providing a computer-implemented method, a computer program product and a device comprising a touchscreen that facilitate improved robustness against unintended user inputs on the touchscreen.

In the context of the present application, where embodiments of the present invention constitute a method, it should be understood that such a method is a process for execution by a computer; i.e., a computer-implementable method. The various steps of the method therefore reflect various parts of a computer program; e.g., various parts of one or more algorithms.

At least some embodiments of the present invention seek to provide a method of controlling a device having a touchscreen such that the risk of unintended user inputs on the touchscreen is reduced in a more satisfactory manner than in the prior art.

At least some embodiments of the present invention seek to provide a computer program product that facilitates the operation of a device having a touchscreen such that the risk of unintended user inputs is reduced in a more satisfactory manner than in the prior art.

At least some embodiments of the present invention seek to provide a device having a touchscreen that is operable such that the risk of unintended user inputs is reduced in a more satisfactory manner than in the prior art.

Figure 1:
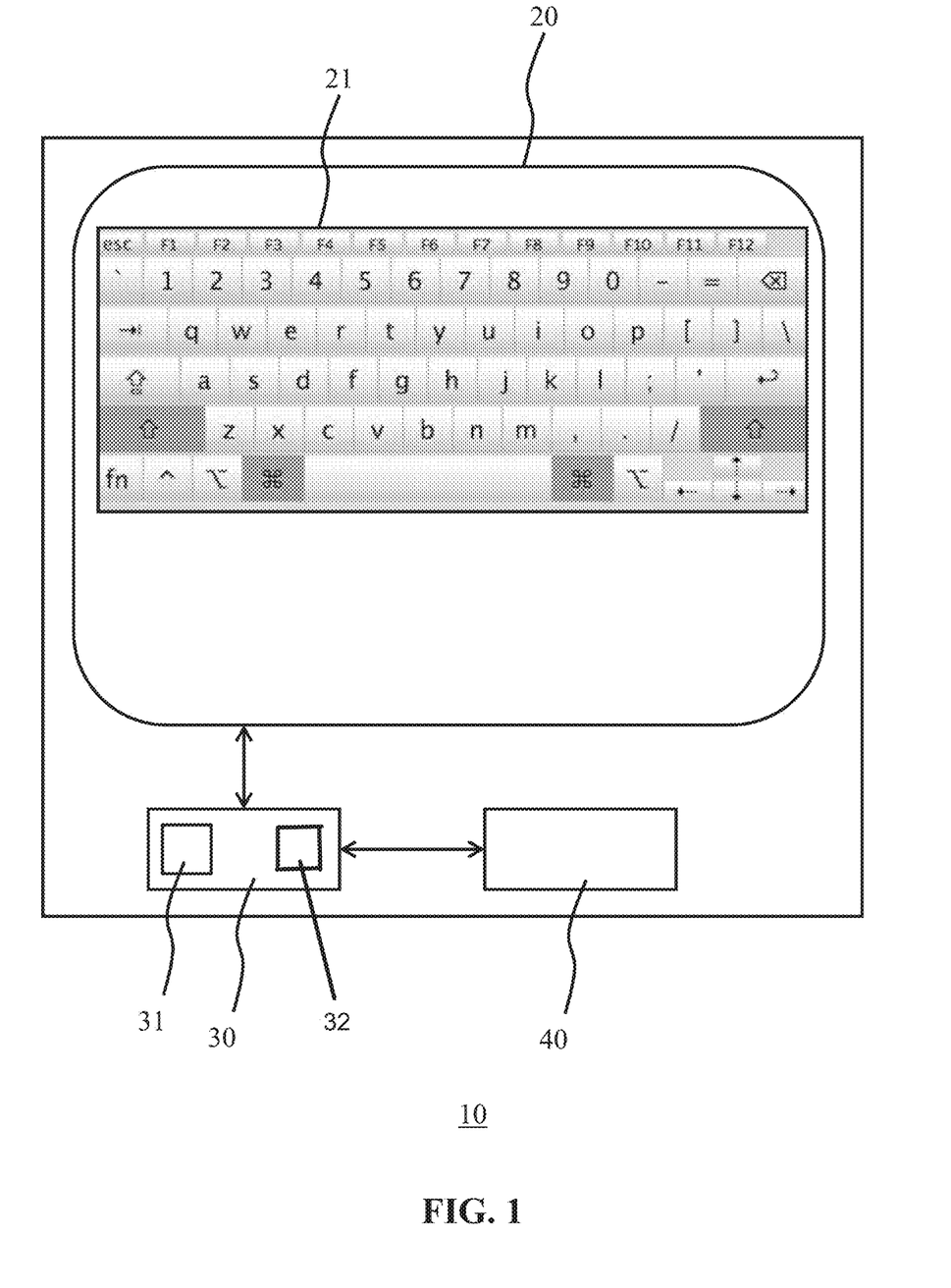
FIG. 1 schematically depicts a device, in accordance with embodiments of the present invention in a first configuration.

FIG. 1 schematically depicts a device 10 in accordance with embodiments of the present invention in a first configuration. The device 10 may be an electronic device, comprising a touchscreen 20 under control of a processing arrangement 30. The device 10 may be any hardware device comprising a touchscreen 20, such as by way of non-limiting example, a computer (e.g., a desktop computer, laptop computer, tablet computer or the like), a mobile communications device (such as a smart phone, a personal digital assistant, or the like), a wearable smart device (such as a smart watch or the like), a navigation device (such as a vehicle navigation device), and so on. The touchscreen 20 may be integrated into a housing of the device 10 further comprising the processing arrangement 30 or may be housed in a separate housing; e.g., the touchscreen 20 may form part of a display monitor that is connected (using a wired or wireless connection) to a further housing comprising the processing arrangement 30, as for instance may be the case for a desktop computer. It should be understood that any suitable type of touchscreen 20 may form part of the device 10.

The processing arrangement 30 may be a single processor, or a cluster or otherwise grouped collection of processors, which may be any suitable type of processor; e.g., a single core processor, a multi-core processor, an application specific integrated circuit (ASIC), and so on. Different processors may be arranged to perform different tasks; for example, the processing arrangement 30 may comprise one or more processors 32 (e.g., a central processing unit (CPU)) for general processing tasks and a graphics processing unit (GPU) for performing computationally intensive graphics processing tasks. The processing arrangement 30 may comprise one or more synchronous processors, in which case the processing arrangement 30 may further comprise at least one clock or timer 31 for clocking or timing the operation cycles performed by the processing arrangement 30.

The device 10 may further comprise at least one data storage device 40 accessible by the processing arrangement 30. The data storage device 40 may store the operating system of the device 10. The data storage device 40 may be dedicated to the storage of the operating system or may further store additional data; e.g., application data, user-generated data, and so on. Any suitable type of data storage device 40 may be used for this purpose. Non-limiting examples of such a data storage device 40 may include a volatile memory, a non-volatile memory, a flash memory, a solid state memory, and so on. The data storage device 40 may be a contiguous data store contained in a single data storage device 40, or may be a distributed data store distributed over multiple data storage devices 40, which multiple data storage devices 40 may be spatially clustered or spatially distributed over the device 10; e.g., physically located in different entities of the device 10, or e.g., physically located in different devices 10.

The device 10 may comprise many more components, such as a wireless or wired network communication interface, additional user interfaces, peripheral devices, interface ports, a power supply such as one or more battery packs, and so on.

During operation of the device 10, the user may launch an application that triggers the generation of a dialogue interface 21 on the touchscreen 20. In the context of the present application, a dialogue interface is an interface that allows the user to provide user inputs through the touchscreen 20. For example, the dialogue interface 21 may be an on-screen keyboard as shown in FIG. 1, or may be a dialogue box such as a pop-up window or the like including one or more entities such as on-screen buttons, toggles, keys, switches or the like, that may be engaged by the user touching the entities. Non-limiting examples of applications that may represent the present application include e-mail clients, social media applications, Short Message Service (SMS) clients, text processing applications, and so on.

Figure 2:
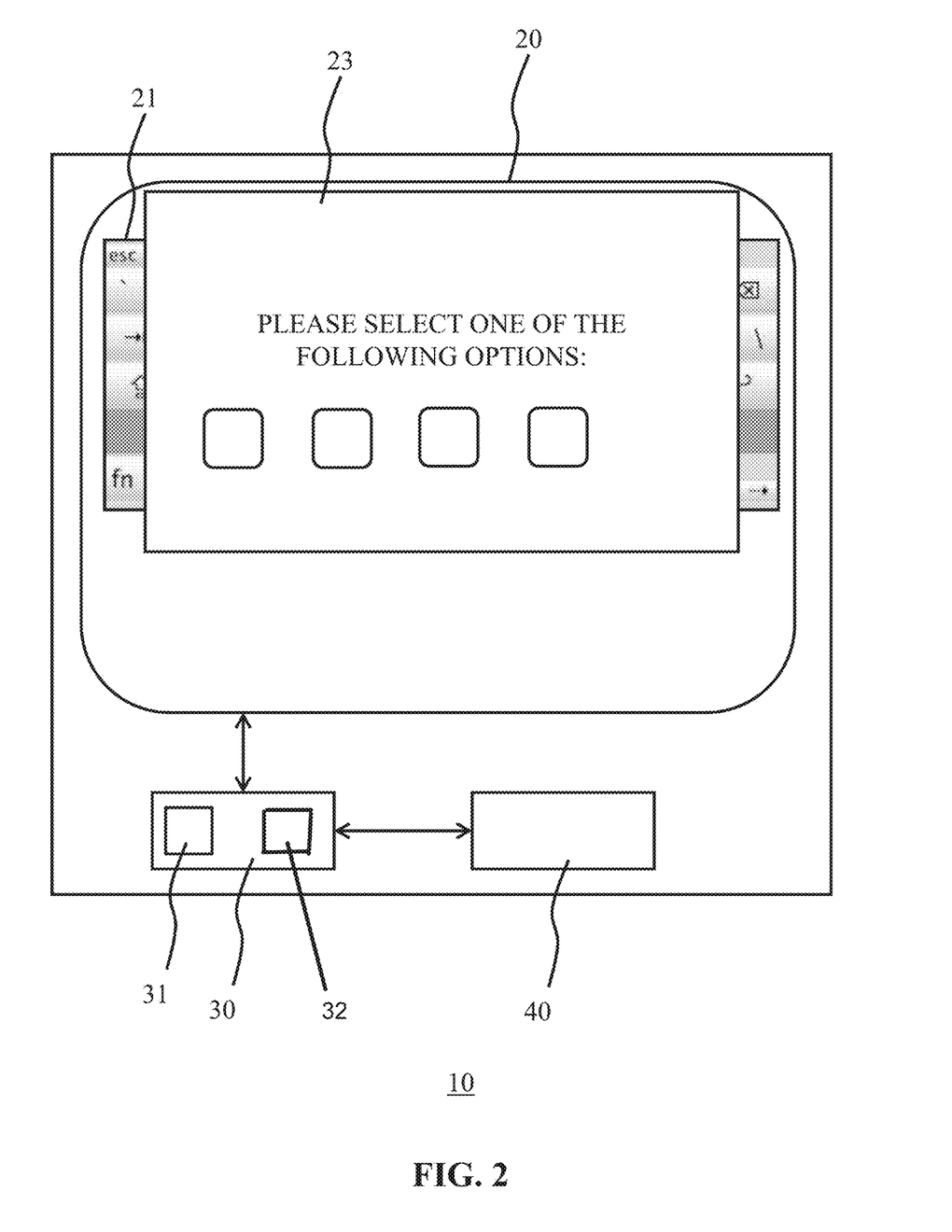
FIG. 2 schematically depicts the device of FIG. 1, in accordance with embodiments of the present invention in a second configuration.

While the user is providing inputs to the device 10 through the dialogue interface 21, the operating system of the device 10 may perform background operations that at some stage require a user input, at which point in time the operating system may trigger the processing arrangement 30 to generate a further dialogue interface 23 on the touchscreen 20, as depicted in FIG. 2 which schematically depicts the device 10, in accordance with embodiments of the present invention in a second configuration.

Such background operations are not particularly limited and may be any type of operation that may trigger the need to generate such a further dialogue interface 23; e.g., a background application monitored by an application handler of the operating system requiring further user configuration, as suggested by the example text "PLEASE SELECT ONE OF THE FOLLOWING OPTIONS:" in the further dialogue interface 23, a further dialogue interface 23 launched in response to a system parameter monitored by the operating system reaching a critical value; e.g., the charge in a battery reaching a critical level, and so on.

Such further dialogue interface 23 may take precedence over the dialogue interface 21; e.g., be superimposed on the dialogue interface 21 without prior warning. Consequently, a user attempting to input a series of inputs using the dialogue interface 21 may be temporarily unaware that the dialogue interface 21 has been replaced by the further dialogue interface 23, causing the user to generate inputs, using the further dialogue interface 23, that were intended for the dialogue interface 21, which not only is annoying to the user, but can cause the user to incorrectly configure an application or operation associated with the further dialogue interface 23 by touching the wrong options in the further dialogue interface 23, which may be cumbersome to rectify and in some cases may even jeopardize the safe operation of the device 10; e.g., when inadvertently installing malware or inadvertently causing the premature termination of an application or function.

Embodiments of the present invention are based on the insight that the way the user interacts with the device 10 (i.e., with the touchscreen 20), may be monitored to temporarily disable responsiveness of the touchscreen 20 to user inputs upon the operating system triggering the processing arrangement 30 to generate a further dialogue interface 23 on the touchscreen 20, with the period of time for which the touchscreen 20 is unresponsive being based on this user interaction; e.g., a monitored interaction speed, reaction speed and/or a user input in progress. This way, the user is more likely to detect the launch of the further dialogue interface 23 without inadvertently providing the further dialogue interface 23 with one or more inputs, while at the same time minimizing the duration of the inconvenience of an unresponsive touchscreen 20.

Figure 3:
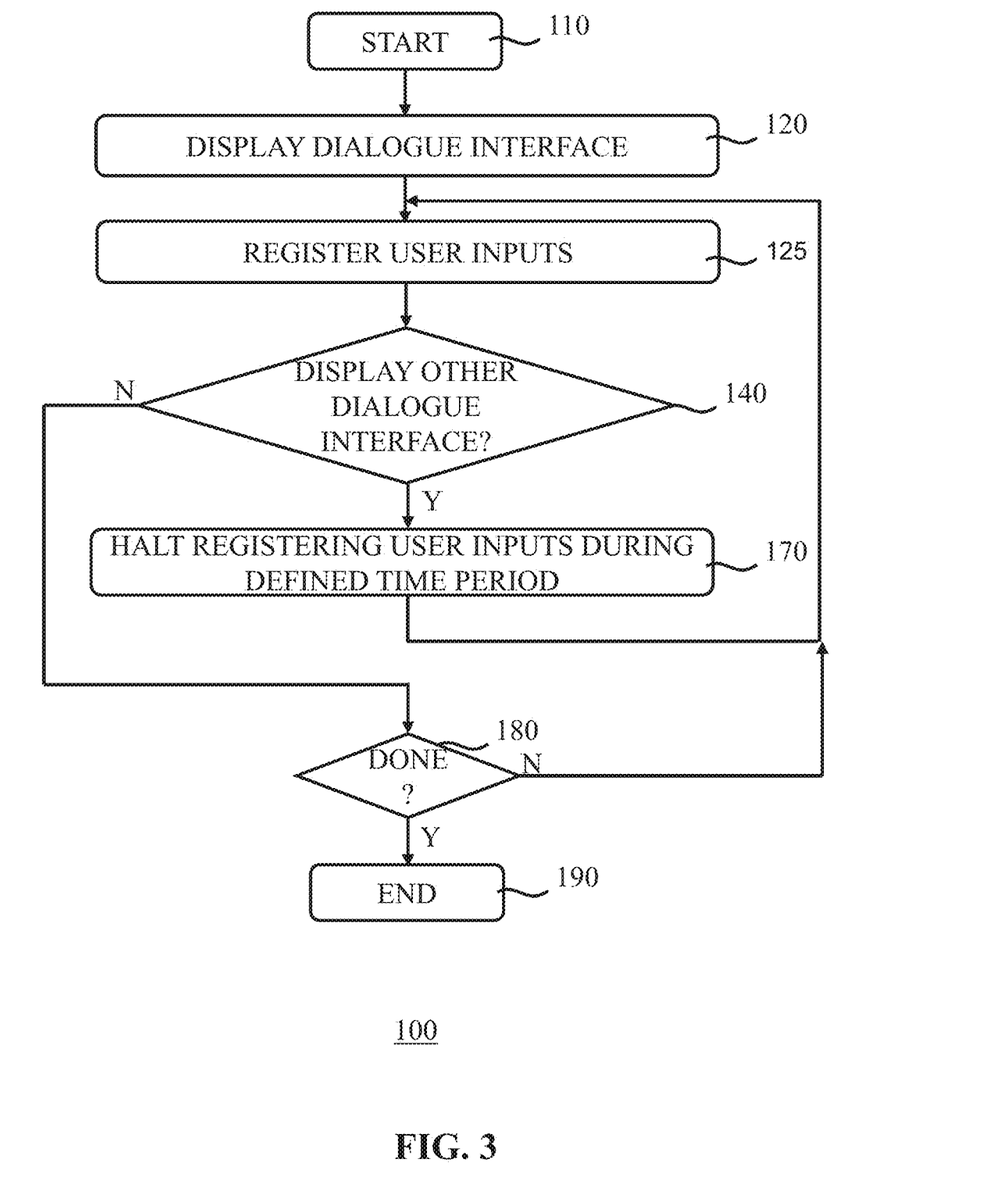
FIG. 3 is a flowchart of an embodiment of a method of controlling the device in FIG. 1.

FIG. 3 is a flowchart of an embodiment of a method 100 of controlling the device 10 in FIG. 1. The method 100 starts in step 110, e.g. with the user enabling the device 10 and/or launching an application triggering the generation of a dialogue interface 21 on the touchscreen 20 of the device 10 by the processing arrangement 30 in step 120 and the registering of user inputs on the touchscreen 20; e.g. finger touches or stylus touches, in step 125.

During the registering of these user inputs in step 125, step 140 determines if the operating system triggers the display of a further dialogue interface 23 on the touchscreen 20. If this is not the case (N), step 180 determines if the user has finished with the dialogue interface 21. If the user has not finished (N), the method 100 reverts back to step 125; otherwise (Y), the method 100 terminates in step 190.

If on the other hand it is determined in step 140 that the operating system is to trigger the display of a further dialogue interface 23 on the touchscreen 20 (Y) (i.e., a further dialogue interface 23 taking precedence over the dialogue interface 21), the method 100 proceeds to step 170 in which the user inputs provided to the touchscreen 20 are ignored for a defined period of time. The defined period of time is defined based on how the user typically interacts with the touchscreen 20. The user inputs may be ignored by registering the user inputs with the touchscreen 20 but not processing the registered user inputs with the processing arrangement 30 or alternatively may be ignored by disabling the touchscreen sensitivity of the touchscreen 24 the defined period of time. Other ways of temporarily ignoring the user inputs may be contemplated. Upon completion of the defined period of time, the method 100 may revert back to step 125 in order to register further user inputs provided through the touchscreen 20. The further inputs have an improved likelihood of being appropriate for the further dialogue interface 23 due to the fact that the user has had time, during the defined period of time at which the user inputs were ignored in step 170, to notice that the active dialogue interface 21 has been replaced with the active further dialogue interface 23.

Figure 4:
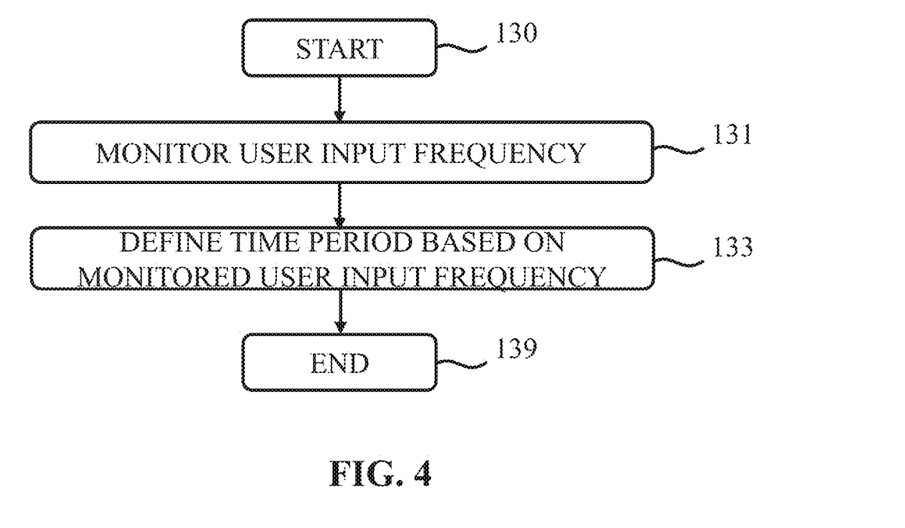
FIG. 4 is a flowchart of an aspect of the method of FIG. 3, in accordance with embodiments of the present invention.

FIG. 4 is a flowchart of an aspect of the method 100 of FIG. 3, in accordance with embodiments of the present invention. The period of time applied by the method 100 in step 170 may be determined in a number of ways, an example embodiment of which is depicted by the flowchart in FIG. 4 which starts at step 130. In this embodiment, the method 100 may, during execution of the registering of the user input in step 125 of FIG. 3), monitor the frequency at which such user inputs are provided to the touchscreen 20, e.g. to the dialogue interface 21, for example by counting the number of user inputs during a set period of time as determined with the timer 31. Such frequent monitoring may be applied in any suitable manner, for example continuously or alternatively periodically. In the latter embodiment of periodic monitoring, the method 100 may for instance be determined that, over a monitoring period, the input frequency of user inputs has remained relatively constant, which for example may indicate that a user has become accustomed to the device 10, after which the method 100 may stop monitoring the input frequency of the user inputs to the touchscreen 20 and may rely on the previously determined input frequency, which may be periodically checked to ensure that the previously determined input frequency has not changed.

The defined period of time applied in step 170 may be defined based on this determined user input frequency in step 133 before this aspect of the method 100 terminates in step 139. For example, the defined period of time to be applied in step 170 may be set such that the defined period of time lasts at least one period of the user input frequency, which ensures that the user provides at least one input to which the device 10 does not respond, which may trigger the user to focus on what is displayed on the touchscreen 20, thereby noticing the further dialogue interface 23 and avoiding the provision of inadvertent inputs to the further dialogue interface 23. It should be understood that other definitions of the period of time to be applied in step 170 are equally feasible. For example, this period of time may be defined to include multiple periods of the user input frequency; e.g., two, three, four, five periods, and so on. The number of periods may be selected based on the value of the user input frequency. For example for a user having a relatively high user input frequency, a larger number of periods may be selected in order to ensure a sufficient duration of the defined period of time to be applied in step 170. In an embodiment, the number of periods may be user-selected; e.g., as a setting in the operating system.

Figure 5:
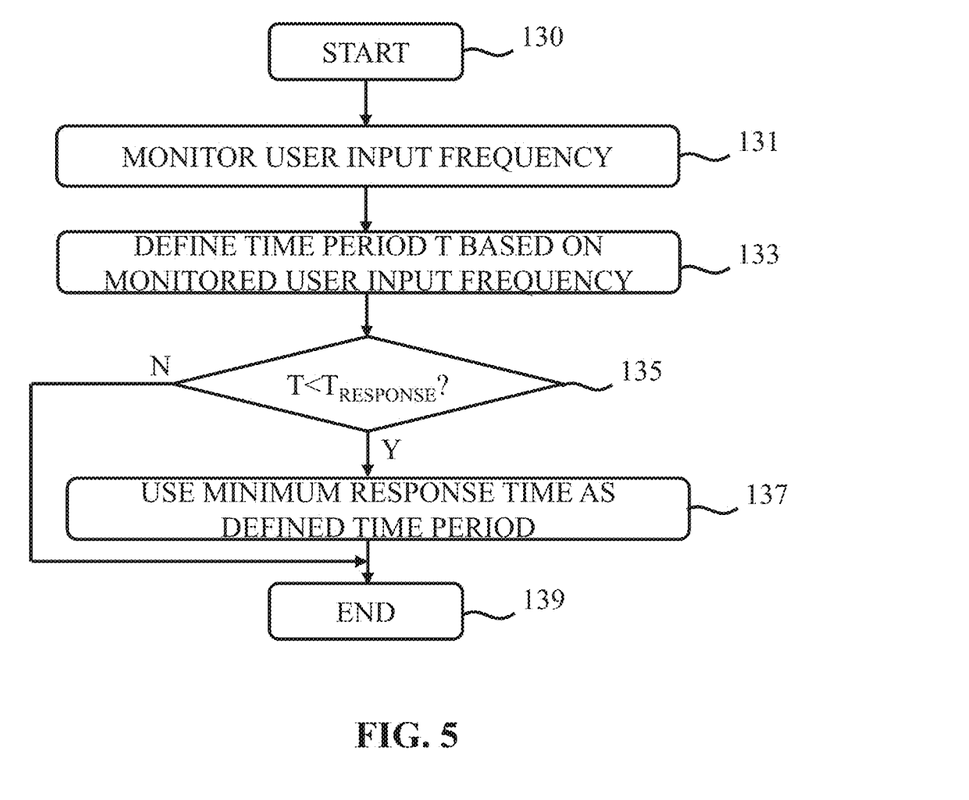
FIG. 5 is a flowchart of an aspect of the method of FIG. 4, in accordance with embodiments of the present invention.

FIG. 5 is a flowchart of an aspect of the method of FIG. 4, in accordance with embodiments of the present invention. As depicted in FIG. 5, upon defining the time period T in step 133, the method 100 may proceed to step 135 in which the defined time period T is compared against a minimum visual response time $T_{response}$, which defines a typical human reaction time for responding to a visual stimulus; e.g., the display of a further dialogue interface 23 on the touchscreen 20. The minimum visual response time $T_{response}$ may be a static, e.g. predefined, response time, e.g. about 0.25 seconds, or alternatively may be user-specific, e.g. may be determined by the operating system of the device 10 by monitoring typical response times of the user to a visual stimulus displayed on the touchscreen 20. Such a user-specific response time may be determined during normal use of the device 10 or alternatively may be determined during a calibration routine; e.g., during setup of the device 10.

If it is determined in step 135 that the period of time T defined in step 133 is less than the minimum visual response time $T_{response}$ (Y), the method 100 may proceed to step 137 in which the defined period of time T is replaced with the minimum visual response time $T_{response}$ before terminating in step 139, which ensures that the user will have had sufficient time to register the display of the further dialogue interface 23 before the completion of the period of time in step 170 during which the device 10 does not respond to user inputs provided by the user through the touchscreen 20, thereby reducing the risk of the user providing inadvertent user inputs to the further dialogue interface 23. If on the other hand it is decided in step 135 that the period of time T defined in 133 is at least as long as the minimum visual response time $T_{response}$ (N), the method 100 may skip step 137 and terminate in step 139 such that the period of time defined in step 133 based on the user input frequency is retained.

Figure 6:
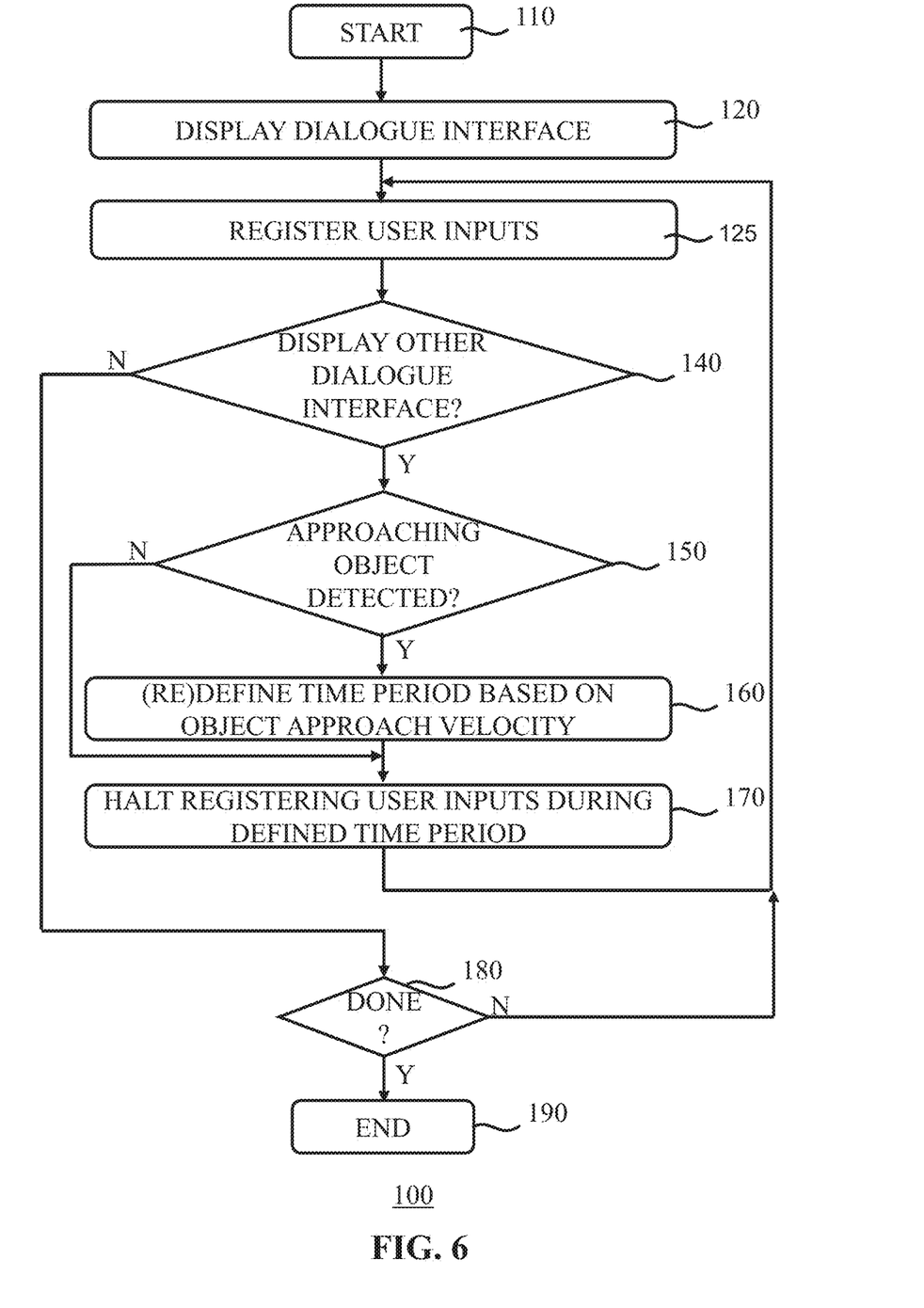
FIG. 6 is a flowchart of a further embodiment of the method of FIG. 3.

FIG. 6 is a flowchart of a further embodiment of the method 100 of FIG. 3. The aspect of the method 100 already described with the aid of FIG. 3 will not be described again for the sake of brevity only. In this further embodiment, if it is determined in step 140 that the operating system does not trigger the display of a further dialogue interface 23 on the touchscreen 20 (N), the method 100 may branch to step 180. If it is determined in step 140 that the operating system triggers the display of a further dialogue interface 23 on the touchscreen 20 (Y), the method 100 may proceed to step 150 in which it is determined if an object, e.g. a finger or stylus, is approaching the touchscreen 20, which may be indicative of the user being in the process of providing the touchscreen 20 with a user input.

For example, it is known per se to detect the presence of such an object hovering within a defined distance over the touchscreen 20. Technologies are known that can detect such object hovering at a distance of up to 20 mm from the touchscreen 20. Consequently, upon detection of an object hovering over the touchscreen 20 within a detection distance from the touchscreen 20 in step 150 (Y), the method 100 may proceed to step 160 in which the defined period of time is redefined in response to this detected presence of the object. For example, the previously defined period of time to be applied in step 170 may be extended by a further period of time, e.g. a fixed period of time, to ensure that the user input in progress, which is not intended for the further dialogue interface 23, is not registered in the context of the further dialogue interface 23.

Alternatively, rather than detecting the hovering of an object within the detection distance from the touchscreen 20, the method 100 may detect such an object approaching the touchscreen 20 by monitoring the velocity of the object in a direction normal to the major plane of the touchscreen 20, which improves the accuracy of the detection of a user input in progress, as a hovering object may not necessarily lead to the provision of a user input on the touchscreen 20, whereas an object approaching the touchscreen 20 is more likely to be associated with the provision of such a user input.

The method 100 may subsequently proceed to step 170 in which the extended period of time during which the device 10 ignores user inputs through the touchscreen 20 is applied. Alternatively, it is determined in step 150 that no such object is hovering over or approaching the touchscreen 20 (N), the method 100 may instead apply the originally defined period of time, e.g. a period of time based on the user input frequency, in step 170, before performing the previously described check in step 180 and terminating in step 190.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention may comprise one or more computerdable hardware storage devices having computer readable program code stored therein, said program code executable by one or more processors to implement the methods of the present invention.

A hardware device of the present invention may comprise one or more processors, one or more memories, and one or more computer readable hardware storage devices, said one or more hardware storage device containing program code executable by the one or more processors via the one or more memories to implement the methods of the present invention.

A dedicated device or computer may comprise a combination of computer hardware and software (fixed in capability or programmable) specifically designed for executing a specialized function. Programmable embedded computers or devices may comprise specialized programming interfaces.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for controlling a device comprising one or more processors, a touchscreen, and an operating system, said method comprising:
    displaying, by the one or more processors, a first dialogue interface on the touchscreen for receiving user commands by a user touching the first dialogue interface, said first dialogue interface comprising symbols visually depicting input entered by the user in response to the symbols being touched by the user;
    in response to the operating system causing a generation of a second dialogue interface overlapping the first dialogue interface on the touchscreen, disabling, by the one or more processors, a sensitivity of the touchscreen for a defined first period of time, to touch of the touchscreen so that the touchscreen is insensitive to user input associated with touch of the touchscreen throughout the first period of time, wherein a magnitude of the first period of time throughout which the touch screen is insensitive to user input associated with touch of the touchscreen is a function of a user interaction with the touch screen by the user;
    determining, by the one or more processors, a frequency at which the first dialogue interface receives the user commands; and
    defining, by the one or more processors, the first period of time based on the determined frequency.

2. The method of claim 1, said method further comprising:
    comparing, by the one or more processors, the defined first period of time based on the determined frequency with a defined second period of time indicative of a minimum user reaction time; and
    in response to a determination from said comparing that the defined first period of time based on the determined frequency is less than the second period of time indicative of a minimum user reaction time, replacing, by the one or more processors, the defined first period of time based on the determined frequency with the defined second period of time indicative of a minimum user reaction time.

3. The method of claim 1, said method further comprising:
    determining, by the one or more processors, a velocity of an object approaching the touchscreen coinciding with the generation of the second dialogue interface on the touchscreen; and
    defining, by the one or more processors, the first period of time based on the determined velocity.

4. The method of claim 3, wherein said defining the first period of time based on the determined velocity comprises increasing a predefined period of time based on the determined velocity.

5. A computer program product, comprising one or more computer readable hardware storage devices having computer readable program code stored therein, said program code containing instructions executable by one or more processors of a device to implement a method for controlling the device, said device comprising a touchscreen and an operating system, said method comprising:
    displaying, by the one or more processors, a first dialogue interface on the touchscreen for receiving user commands by a user touching the first dialogue interface, said first dialogue interface comprising symbols that visually depict input entered by the user in response to the symbols being touched by the user;
    in response to the operating system causing a generation of a second dialogue interface overlapping the first dialogue interface on the touchscreen, disabling, by the one or more processors, a sensitivity of the touchscreen for a defined first period of time, to touch of the touchscreen so that the touchscreen is insensitive to user input associated with touch of the touchscreen throughout the first period of time, wherein a magnitude of the first period of throughout which the touch screen is insensitive to user input associated with touch of the touchscreen is a function of a user interaction with the touch screen by the user;
    determining, by the one or more processors, a frequency at which the first dialogue interface receives the user commands; and
    defining, by the one or more processors, the first period of time based on the determined frequency.

6. The computer program product of claim 5, said method further comprising:
    comparing, by the one or more processors, the defined first period of time based on the determined frequency with a defined second period of time indicative of a minimum user reaction time; and
    in response to a determination from said comparing that the defined first period of time based on the determined frequency is less than the second period of time indicative of a minimum user reaction time, replacing, by the one or more processors, the defined first period of time based on the determined frequency with the defined second period of time indicative of a minimum user reaction time.

7. The computer program product of claim 5, said method further comprising:
   determining, by the one or more processors, a velocity of an object approaching the touchscreen coinciding with the generation of the second dialogue interface on the touchscreen; and
   defining, by the one or more processors, the first period of time based on the determined velocity.

8. The computer program product of claim 7, wherein said defining the first period of time based on the determined velocity comprises increasing a predefined period of time based on the determined velocity.

9. A device, comprising one or more processors, one or more memories, one or more computer readable hardware storage devices, a touchscreen, and an operating system, said one or more hardware storage devices containing program code executable by the one or more processors via the one or more memories to implement a method for controlling the device, said method comprising:
   displaying, by the one or more processors, a first dialogue interface on the touchscreen for receiving user commands by a user touching the first dialogue interface, said first dialogue interface comprising symbols that visually depict input entered by the user in response to the symbols being touched by the user;
   in response to the operating system causing a generation of a second dialogue interface overlapping the first dialogue interface on the touchscreen, disabling, by the one or more processors, a sensitivity of the touchscreen for a defined first period of time, to touch of the touchscreen so that the touchscreen is insensitive to user input associated with touch of the touchscreen throughout the first period of time, wherein a magnitude of the first period of time throughout which the touch screen is insensitive to user input associated with touch of the touchscreen is a function of a user interaction with the touch screen by the user;
   determining, by the one or more processors, a frequency at which the first dialogue interface receives the user commands; and
   defining, by the one or more processors, the first period of time based on the determined frequency.

10. The device of claim 9, said method further comprising:
    comparing, by the one or more processors, the defined first period of time based on the determined frequency with a defined second period of time indicative of a minimum user reaction time; and
    in response to a determination from said comparing that the defined first period of time based on the determined frequency is less than the second period of time indicative of a minimum user reaction time, replacing, by the one or more processors, the defined first period of time based on the determined frequency with the defined second period of time indicative of a minimum user reaction time.

11. The device of claim 9, said method further comprising:
    determining, by the one or more processors, a velocity of an object approaching the touchscreen coinciding with the generation of the second dialogue interface on the touchscreen; and
    defining, by the one or more processors, the first period of time based on the determined velocity.

12. The device of claim 11, wherein said defining the first period of time based on the determined velocity comprises increasing a predefined period of time based on the determined velocity.

13. The method of claim 1, wherein the first dialogue interface is an on-screen keyboard.

14. The method of claim 1, wherein the first dialogue interface is a pop-up window.

* * * * *